(12) United States Patent
Chavez et al.

(10) Patent No.: US 11,600,063 B1
(45) Date of Patent: *Mar. 7, 2023

(54) GUIDED INSPECTION SYSTEM AND METHOD

(71) Applicant: UIPCO, LLC, San Antonio, TX (US)

(72) Inventors: Carlos J P Chavez, San Antonio, TX (US); Quian Antony Jones, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/518,174

(22) Filed: Nov. 3, 2021

Related U.S. Application Data

(63) Continuation of application No. 16/288,629, filed on Feb. 28, 2019, now Pat. No. 11,200,421.

(60) Provisional application No. 62/721,501, filed on Aug. 22, 2018.

(51) Int. Cl.
| | | |
|---|---|---|
| *G06V 20/20* | (2022.01) | |
| *G06T 19/00* | (2011.01) | |
| *G06N 20/00* | (2019.01) | |
| *G01C 21/20* | (2006.01) | |
| *H04W 4/02* | (2018.01) | |
| *G06V 10/20* | (2022.01) | |
| *G10L 13/00* | (2006.01) | |

(52) U.S. Cl.
CPC ........... *G06V 20/20* (2022.01); *G01C 21/206* (2013.01); *G06N 20/00* (2019.01); *G06T 19/006* (2013.01); *G06V 10/255* (2022.01); *H04W 4/027* (2013.01); *G10L 13/00* (2013.01)

(58) Field of Classification Search
CPC .... G06V 20/20; G06V 10/255; G01C 21/206; G06N 20/00; G06T 19/006; G06T 11/00; H04W 4/027; H04W 4/024; G10L 13/00; G06F 3/011
See application file for complete search history.

(56) References Cited

U.S. PATENT DOCUMENTS

| | | | |
|---|---|---|---|
| 9,611,038 B2 * | 4/2017 | Dahlstrom | B64C 39/024 |
| 10,579,749 B1 * | 3/2020 | Davis | G06F 30/20 |
| 10,692,050 B2 * | 6/2020 | Taliwal | G06T 7/33 |
| 2015/0094089 A1 * | 4/2015 | Moeglein | G06T 7/80 |
| | | | 455/456.1 |
| 2015/0186953 A1 | 7/2015 | Gross et al. | |
| 2016/0048934 A1 * | 2/2016 | Gross | G06V 10/764 |
| | | | 705/313 |
| 2016/0092959 A1 | 3/2016 | Gross | |
| 2016/0343032 A1 | 11/2016 | DeWitt | |

(Continued)

*Primary Examiner* — Qun Shen
(74) *Attorney, Agent, or Firm* — Plumsea Law Group, LLC

(57) ABSTRACT

A system and method for a guided inspection of an apartment, home or other physical space is disclosed. The system and method use augmented reality to guide a user through a physical space. The system and method further use machine learning to automatically detect and classify damage to various physical structures in the physical space. In response to detected damage, the system may prompt a user to move closer to the detected damage for further inspection. The system can also detect obscured structures and prompt a user to make changes to the environment to increase the visibility of the obscured structures.

20 Claims, 10 Drawing Sheets

(56) References Cited

U.S. PATENT DOCUMENTS

| | | | |
|---|---|---|---|
| 2017/0052070 A1* | 2/2017 | Marsh | G01J 5/10 |
| 2017/0148102 A1* | 5/2017 | Franke | G06K 9/6267 |
| 2018/0025392 A1* | 1/2018 | Helstab | G06Q 10/10 |
| | | | 705/306 |
| 2020/0061839 A1* | 2/2020 | Deyle | G06Q 10/087 |

* cited by examiner

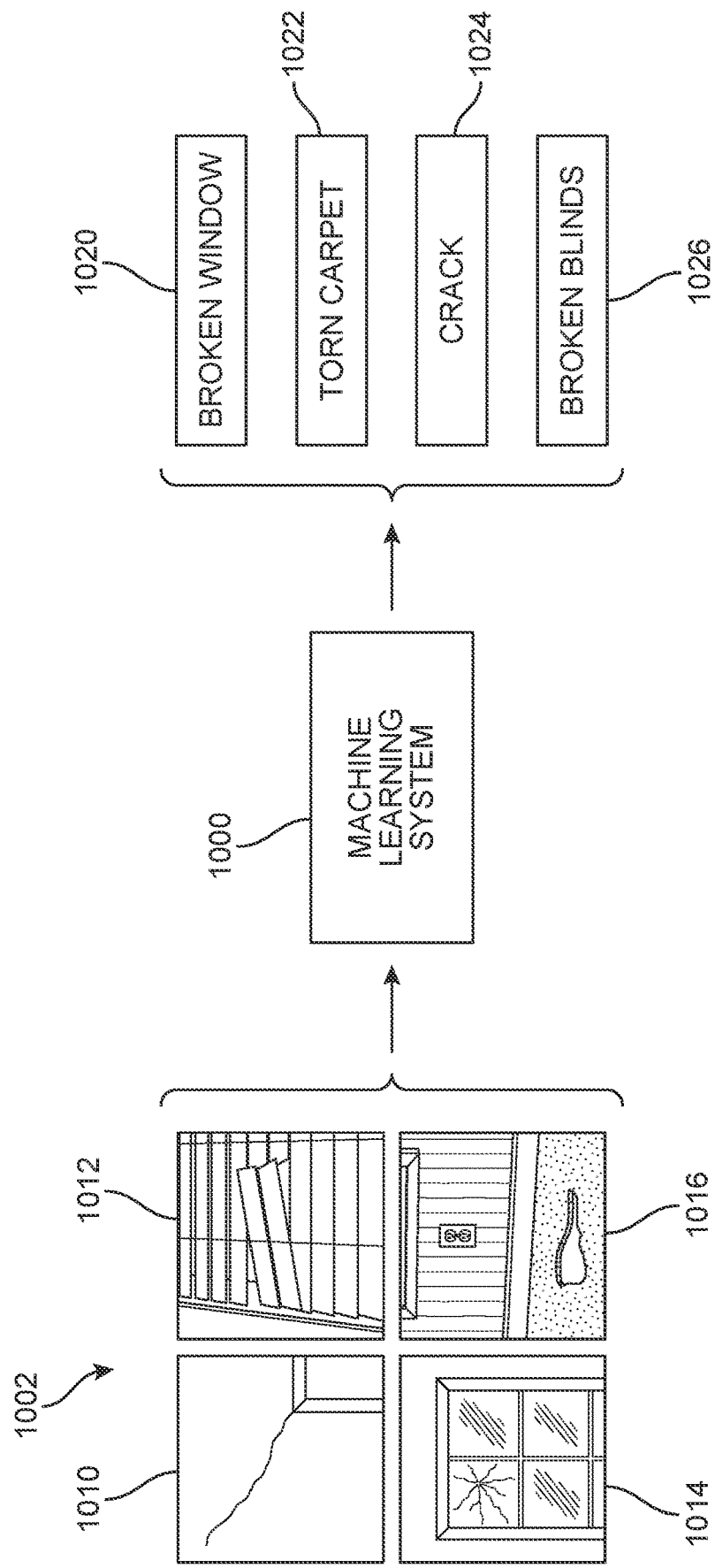

GUIDED INSPECTION SYSTEM AND METHOD

CROSS-REFERENCE TO RELATED APPLICATIONS

This application is a continuation of and claims priority to U.S. patent application Ser. No. 16/288,629, filed Feb. 28, 2019 and titled "Guided Inspection System and Method", which application claims the benefit of U.S. Provisional Patent Application No. 62/721,501, filed Aug. 22, 2018, and titled "Guided Inspection System and Method," the disclosures of which applications are incorporated by reference herein in their entirety.

TECHNICAL FIELD

The present disclosure generally relates to a guided inspection system and method, and specifically to a system and method that use augmented reality to guide a user through a physical space while automatically detecting possible damage.

BACKGROUND

Inspections are common for apartments and other rental properties. Before a new tenant moves in an inspection is performed (by the tenant, property manager, landlord or another party) to determine if there is any existing damage. During the inspection, the tenant makes note of possible issues or damage on a form that is submitted to the landlord, manager, or owner of the apartment/space. By noting pre-existing damage the tenant can inform the landlord, manager or owner of issues that pre-date the new tenant and therefore are not the financial responsibility of the tenant. In many situations, tenants provide a security deposit prior to moving in. Any costs from damage to the property caused by the tenant may be subtracted from the security deposit, with any remainder being returned to the tenant at the end of the rental term. It is therefore in the financial interest of a would-be tenant to make sure an inspection is performed with any pre-existing damage noted in detail.

Inspections for rental properties may not be performed by professionals. In some cases, the inspection is filled out by the new tenant and/or the landlord or manager. The inspection usually requires noting any damage done to a long list of areas and structures provided on a form. The form can be confusing and/or tedious to fill out.

There is a need in the art for a system and method that addresses the shortcomings discussed above.

SUMMARY

In one aspect, a method of guiding a user through an inspection of a physical space includes steps of: (1) receiving image information from a remote device, the image information corresponding to at least one image of the physical space; (2) analyzing the image information to determine if there is damage to a portion of the physical space based on the image information from the remote device; (3) sending instructions to the remote device, the instructions including navigation information; receiving information that a location of the remote device has changed; and (4) sending new instructions to the remote device to capture new images.

In another aspect, a method of guiding a user through an inspection of a physical space using a remote device includes steps of: (1) capturing images of the physical space; (2) sending image information to a server, the image information including at least one image of the physical space; (3) receiving instructions from the server, the instructions including navigation information; (4) prompting the user to move to a location in the physical space in response to the instructions; and (5) monitoring the movement of the remote device and confirming that the user has moved to the location.

In another aspect, a method of guiding a user through an inspection of a physical space includes steps of: (1) receiving image information from a remote device, the image information corresponding to at least one image of the physical space; (2) detecting an obscured structure using the image information; and (3) sending instructions to prompt the user to modify the visibility of the obscured structure.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 10 is a schematic view of a machine learning system, according to an embodiment.

DESCRIPTION OF EMBODIMENTS

The embodiments provide a system and method for guiding a user through an inspection of a physical space, such as a rental apartment. Specifically, the embodiments provide a system and method that use augmented reality to prompt a user to move to various locations in a physical space, automatically analyze images of structures in the physical space, and prompt the user further according to the results of analyzing the images. By automatically capturing and analyzing image information about structures in the physical space to determine if there is damage, the system and method improve the efficiency of the inspection process. By using an augmented reality system to prompt a user, the system and method simplify the inspection process and allow users with little to no experience in inspecting properties to quickly and accurately assess possible damage in a physical space.

As used herein, the terms "artificial intelligence" and "machine learning" may be used to describe a variety of techniques in which an algorithm can learn to improve its performance on a task (for example, classifying images into different categories). The embodiments can make use of any known methods and systems in artificial intelligence and/or machine learning.

As used herein, the term "augmented reality" refers to the ability to combine computer generated sensory information (for example, images) with a real-world environment (for example, images or video of a room or other space). The embodiments also make use of methods and systems related to the field of augmented reality. These include methods for identifying and mapping features in a real-world environment, for generating images and/or other sensory data, and for augmenting the real-world environment with the generated images/sensory data. For example, augmented reality systems (AR systems) may include the capability to: sense a physical space using one or more cameras and build models of the space; generate virtual elements; and augment images of the physical space with the virtual elements using a display of some kind. Software tools for building AR systems are known and provided as open source or commercial AR software development kits (SDKs).

An AR system may make use of various known methods, techniques, or algorithms in robotics and/or navigation. For example, some embodiments may utilize the well known "simultaneous localization and mapping" (SLAM) technique for constructing and updating a map of an unknown environment and determining the location (and pose) of an agent within the map. Some implementations of SLAM can be used to help identify objects, determine distances between objects, determine the dimensions of objects, position objects in a virtual space and/or perform transformations of virtual objects (such as rotation). Various kinds of SLAM techniques are known and adapted to particular kinds of tasks. These include EKF SLAM, FastSLAM, Graph-based SLAM, Topological SLAM and Visual SLAM.

Figure 1:
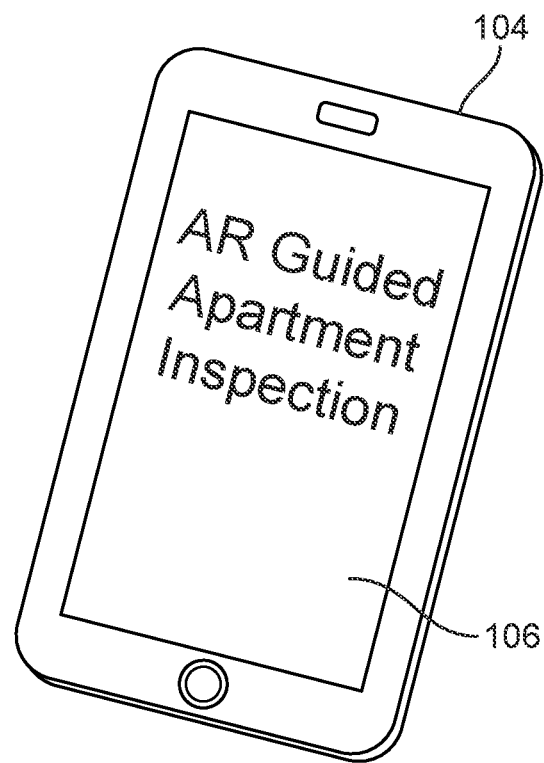
FIG. 1 is a schematic view of an embodiment of a user in an apartment using a remote device to perform a guided inspection.
Figure 1:
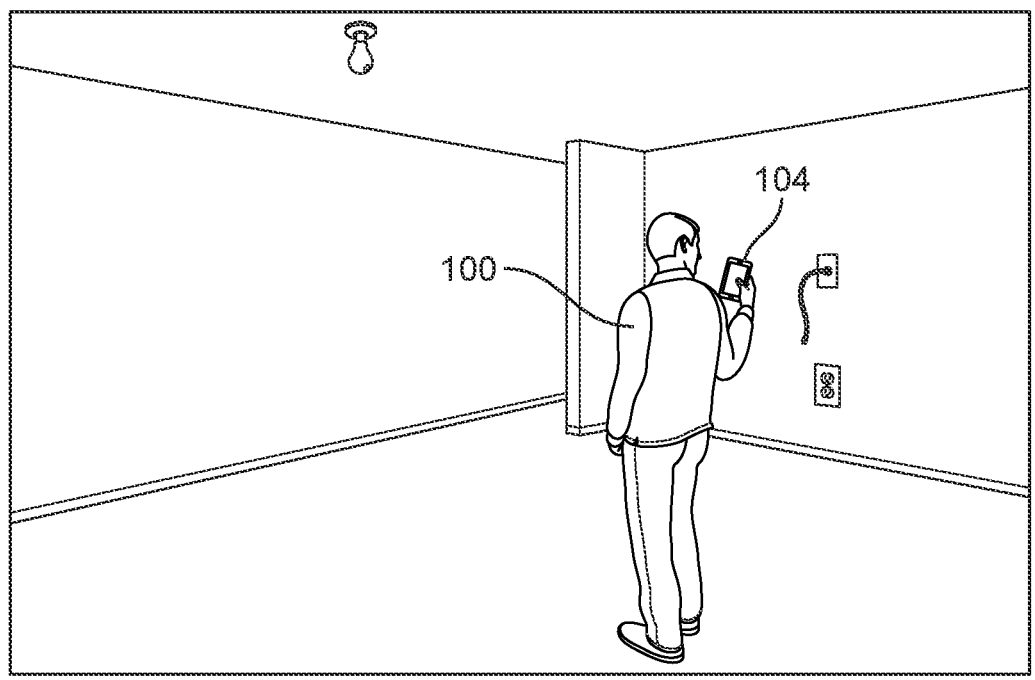

FIG. 1 is a schematic view of a user 100 in a room of an apartment. In the present embodiment, user 100 has a phone 104 that is running a software application 106. Application 106 provides the user interface for an augmented reality guided inspection system that utilizes both augment reality and machine learning. The guided inspection system, described in further detail in FIG. 2, includes a variety of features that may be used to guide a user through an apartment, house or other physical space to perform an automated, or semi-automated, inspection. The system could be used during an apartment inspection that is often performed by a tenant prior to moving into an apartment.

Figure 2:
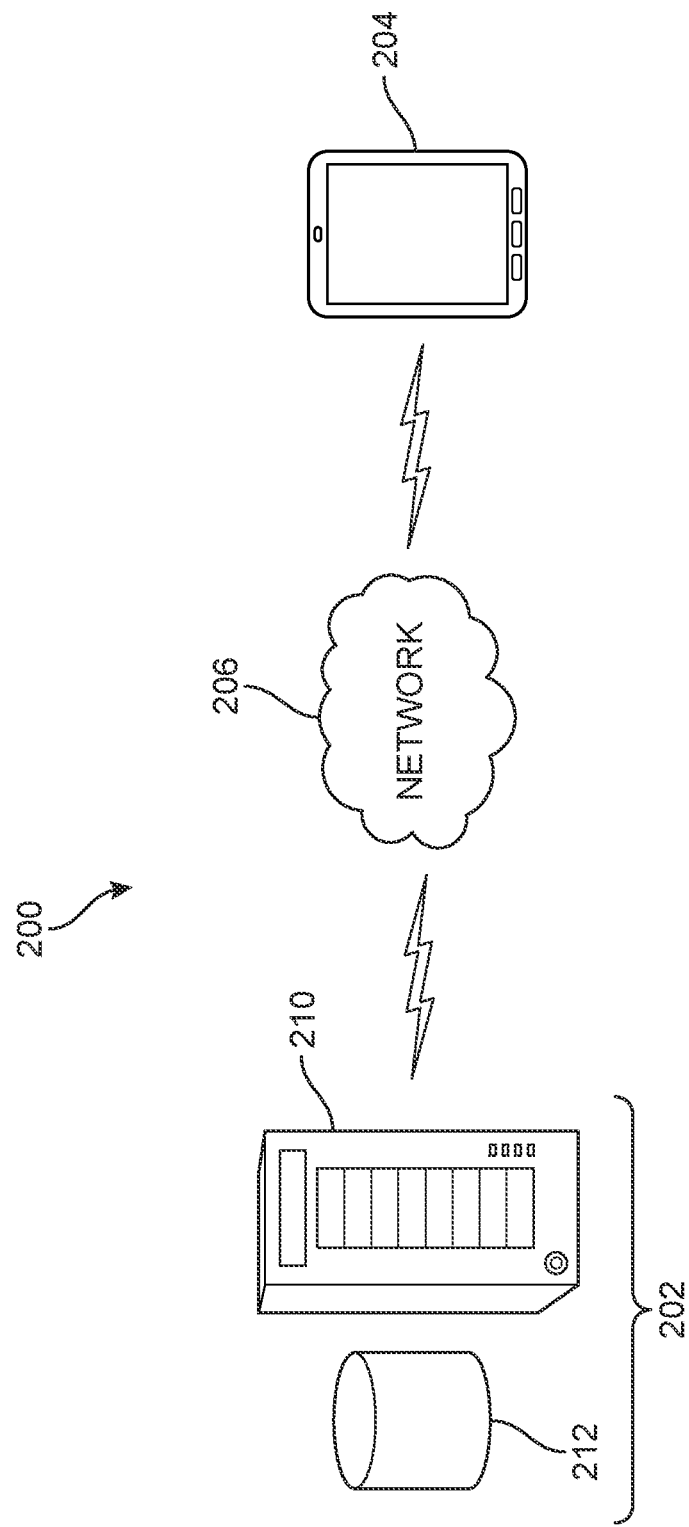
FIG. 2 is a schematic view of an embodiment of a guided inspection system.

FIG. 2 is a schematic view of an embodiment of a guided inspection system 200, also referred to simply as system 200. System 200 may include various sub-systems and other components that facilitate guiding a user through a physical space and automatically performing one or more kinds of inspection tasks. In some cases, the process of guiding a user may be facilitated by augmented reality, including visual displays to help the user navigate through a physical space. In some cases, the process of automatically performing one or more kinds of inspection tasks can include using machine learning to detect and classify possible damage.

Guidance system 200 may comprise a centralized computer system 202 and a remote device 204 that may communicate with one another through a network 206. The term "computer system" refers to the computing resources of a single computer, the partial computing resources of a single computer, a plurality of computers communicating with one another, or a network of remote servers. In an exemplary embodiment, computer system 202 includes at least one server.

Centralized computer system 202 may receive various kinds of information from remote device 204 (or other sources), perform various kinds of analyses and/or store data. Whereas centralized computer system 202 may be located anywhere, remote device 204 may be located on site (for example, with a user at an apartment building) to facilitate the collection of data for an inspection.

In the embodiment of FIG. 2, centralized computer system 202 comprises one or more computing devices 210 (for example, a server) that may be in communication with one or more databases 212. Databases 212 could be co-located with computing device 210 or could be remote databases that are accessible by computing device 210 over network 206. Databases 212 can include any kind of storage devices, including but not limited magnetic, optical, magneto-optical, and/or memory, including volatile memory and non-volatile memory.

Remote device 204 may comprise a device that can be brought to the location where an inspection is to occur. Remote device 204 can comprise a computer system for processing and communicating information. A remote device may generally include a processor, a data storage component and a display. A remote device may also include components to facilitate communication with external systems (for example, hardware and software components to enable communication over network 206). In some cases, a remote device includes one or more physical buttons. In some cases, a remote device includes touchscreen controls. Still further, remote device 204 can include speakers and a microphone for receiving and generating audible sounds. In the exemplary embodiment of FIG. 2, remote device 204 comprises a tablet computing device. In other embodiments, however, a remote device could comprise a smartphone, a laptop, or similar kind of device.

Remote device 204 may include hardware components for capturing sensory information, as well as storing and/or transmitting captured information. As used herein the term "sensory information" can include visual information, audible information, tactile information and/or information related to the motion of the remote device (for example, acceleration information). In an exemplary embodiment, remote device 204 includes a camera for capturing images in the form of photos or video. Remote device 204 may also include an accelerometer and/or gyroscope for detecting linear accelerations and/or angular rotational velocity. In some cases, accelerometer and/or gyroscope data can be used by an AR system to build a map of a physical space and locate the remote device within the map.

Remote device 204 may include additional sensors including, but not limited to: a proximity sensor to detect proximity to one or more objects in a physical space, an ambient light sensor for detecting ambient light conditions in a physical space, and a compass for detecting directional information. Additionally, in some embodiments, remote device 204 may include a GPS receiver for receiving GPS information that can be used to determine the location of the remote device.

Remote device 204 may run one or more software applications that facilitate guiding a user through a physical space for purposes of inspection. These applications could be native to the device's operating system or web-applications that run on a browser. Moreover, an application may be configured with a graphical user interface (GUI) that facilitates visual and/or tactile interaction between a user and elements of a guided inspection system. As one example, FIG. 1 depicts a native software application 106 running on phone 104 that is used to guide a user through an apartment to perform an inspection.

A remote device and a centralized computer system could operate in a client-server relationship. For example, centralized computer system 202 may include a server that communicates with remote device 204 as well as other remote devices. In some cases, multiple remote devices running individual instances of a guidance inspection application could operate as clients in communication with centralized computer system 202 over network 206.

Figure 3:
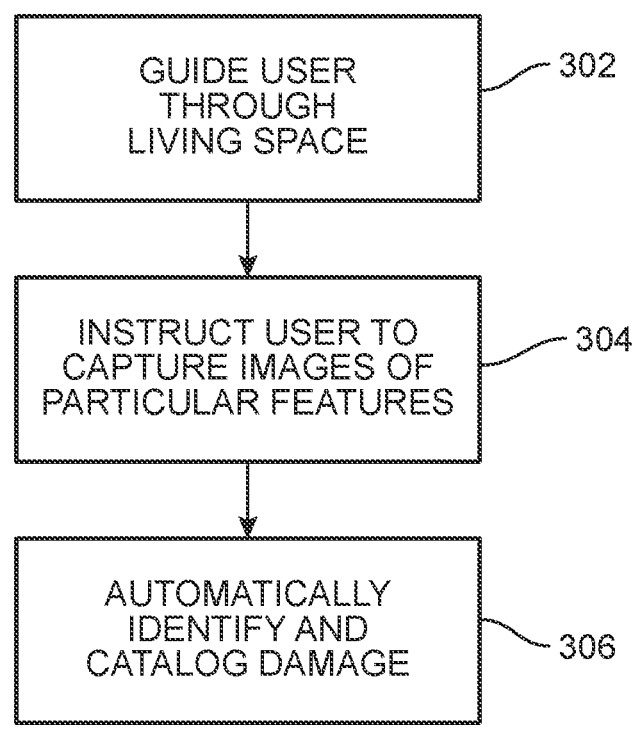
FIG. 3 is a schematic view of a guided inspection process, according to an embodiment.

FIG. 3 is a schematic view of a process of guiding a user through a physical space of some kind with a guided inspection system. The physical space could be an apartment, a condominium, a single-family home, a business property or some other physical space. Moreover, as used herein, a physical space could refer to only a portion of an apartment, single family home, or other physical space. The following steps may be performed by one or more components of a guided inspection system.

In a first step 302, a user may be guided through a living space (i.e., a physical space). Guidance can be accomplished using a remote device (for example, remote device 204). A remote device can direct a user through a living space via one or more guidance prompts. The term "guidance prompt" could refer to displayed text, audible speech, other visual indicators and/or some combination of these. In one embodiment, a system could display a map of the physical space and display a path (or arrow) from the user's current location to another location where the system wants to user to move. In another embodiment, a system could provide verbal commands, such as "move forward 3 feet", "move closer to the wall in front of you", or "move to the kitchen". Such verbal commands could be spoken or displayed as text on the remote device.

Generally, a guided inspection system may guide a user to locations in a physical space where a physical structure can be examined. As used herein, the term "physical structure" refers to some identifiable feature in a physical space. Examples of physical structures include, but are not limited to: walls, doors, door frames, windows, blinds, curtains, ceilings, floors, carpets, counters, cabinets, tables, light fixtures, electrical sockets, appliances, vents, toilets, bathtubs, sinks, as well as other structures. Physical structures could include both fixed and moveable structures. As used herein, the term "fixed structure" refers to a structure with a fixed position within the physical space, which cannot be displaced without disassembly or destruction. Examples of fixed structures include walls, doors and cabinets. Examples of moveable structures include furniture and appliances. In some property inspections the focus is primarily on fixed structures and some appliances.

It is contemplated that an inspection may proceed in a predetermined manner or in an ad hoc manner. In a predetermined inspection, a guided inspection system is aware of a set of target physical structures to be inspected. For example, a guided inspection system could be provided with a map of the physical space, noting the existence and relative locations of various physical structures such as walls, ceilings, floors, doors, rooms, bathrooms, as well as other physical structures. In such a situation the system could guide a user from feature to feature in a predetermined sequence. Alternatively, in an ad hoc inspection, a guided inspection system may not be aware of one or more physical structures ahead of time. In such a situation the system could direct a user to move from one physical structure to another in a more ad hoc manner. In some cases, the system could simply ask a user to proceed to another physical structure without knowing about the feature. For example, the user could be prompted to "move to the next room", or to "move to another door in the apartment", or to "move to the door of the hallway bathroom". In some embodiments, a system could learn new information about a physical space in real time and use that information to direct the user to another physical structure that it has recently identified.

In step 304, a guided inspection system may instruct a user to capture images or other sensory information about particular physical structures. For example, the system could prompt a user to "focus camera on nearby doorknob and take a picture." Alternatively, the system could automatically take pictures (or video) of one or more physical structures as they are automatically identified by an image detection/recognition algorithm. In some cases, a user may be prompted to aim the camera at a particular physical structure and the system may automatically capture images.

In some embodiments, a user may only be instructed to capture an image of a physical structure if there is visible damage. In other embodiments, a user may be instructed to capture images of various physical structures and the system may automatically detect and classify damage without any user input.

Next, in step 306, a guided inspection system can automatically identify/classify and catalog damage to physical structures. For example, a system could automatically detect that a living room carpet is damaged based on images of the carpet. The system may also classify the type of damage (for example, as a tear in the rug). After identifying and classifying the damage, the system may catalog (or store) relevant data in the form of damage information. As used herein, the term "damage information" refers to any information corresponding to some aspect of damage to a physical structure. Damage information could include the type of feature (for example, a wall or a floor) and the type of damage (for example, a tear or a crack).

The catalog of damage information can be used to build an inspection report that lists physical structures in the physical space and the existence and/or type of damage to each physical structure. Alternatively, rather than generating an inspection report, the damage information could be stored in some kind of data structure for later retrieval and use.

Optionally, in at least some embodiments, system 200 may capture information about various objects in a physical space and create an inventory of the objects that can be used to determine quotes for financial products such as renter's or home owner's insurance. In some cases, the objects that are captured and identified may be objects owned by the tenant (or owner), such as televisions and other electronics, jewelry and artwork, and clothing. These objects may be distinct from the fixed physical structures that form part of the property itself, such as the walls, doors and other structures that are often inspected prior to leasing an apartment or other property. Methods of automatically collecting image information about objects in a home, apartment or other property and automatically identifying and cataloguing information about those objects are disclosed in U.S. Pat. No. 11,055,531 titled "AUGMENTED REALITY METHOD FOR REPAIRING DAMAGE OR REPLACING PHYSICAL OBJECTS", the entirety of which is herein incorporated by reference and referred to as the "Method of Repairing Damage" application hereafter. The embodiments can make use of any of the systems and methods described in the Method of Repairing Damage application, thereby allowing a guided inspection system to capture and analyze images of objects and generate estimated quotes for renter's insurance.

Figure 4:
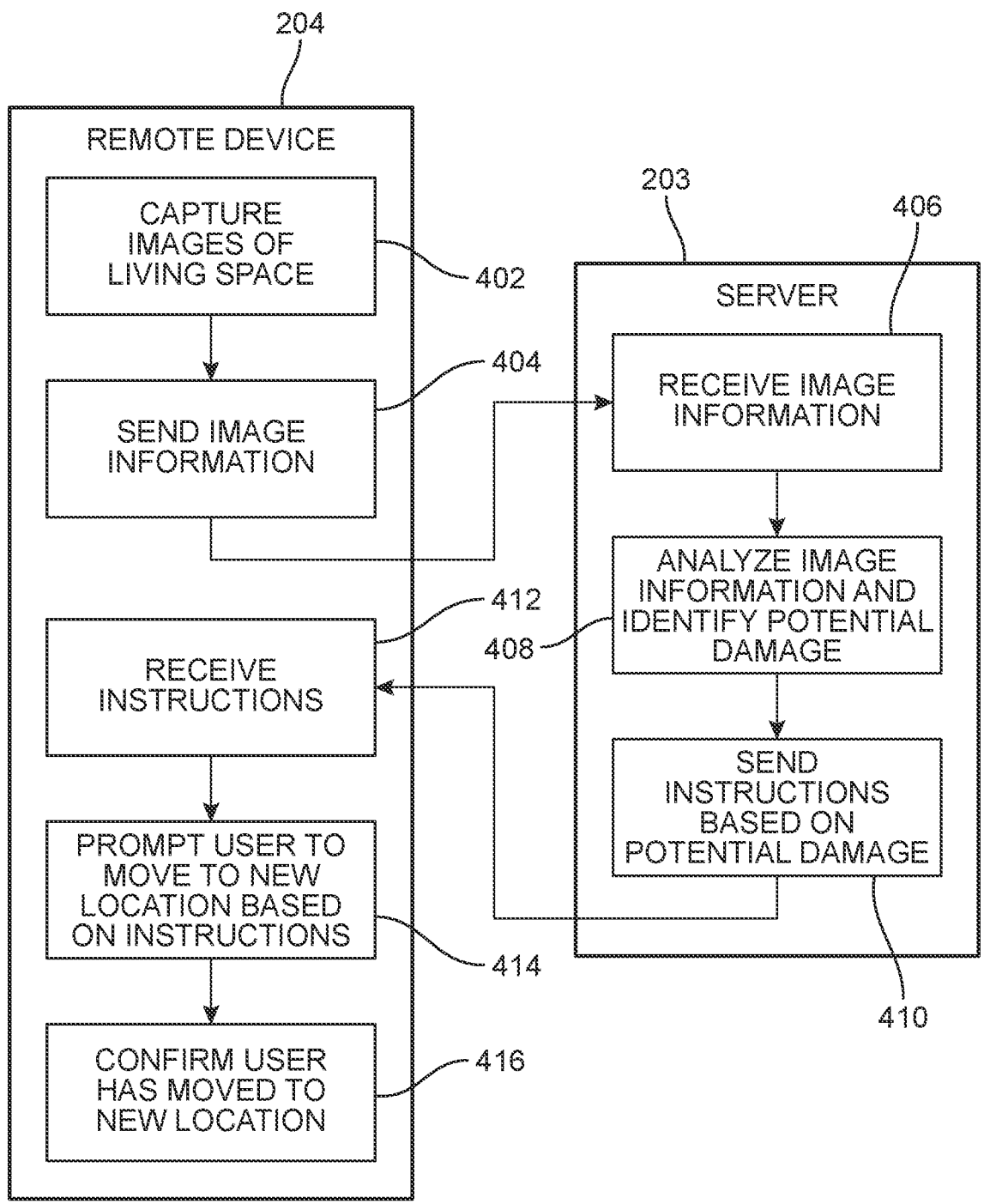
FIG. 4 is a schematic view of a guided inspection process performed using a remote device and a server, according to an embodiment.

The exemplary process depicted in FIG. 4 shows that some steps could be performed by a remote device (for example, remote device 204) and other steps by a component of a centralized computer system (for example, a server 203 of centralized computer system 202). In other embodiments, some steps shown as performed by a remote device could be performed by a centralized computer system or vice-versa.

Initially, a system may guide a user through a living space (i.e., a physical space), as in step 302 of FIG. 3. In some embodiments, remote device 204 may prompt a user to move to a particular location in a physical space, such as a bedroom. As described above, this prompting of the user could be achieved using displayed text, audible speech and/or other displayed visual information such as a map with a route.

As the user is guided through the living space, remote device 204 may capture images (photos or video) of a living space (i.e., a physical space) during step 402. In some cases, remote device 204 may prompt a user to aim the camera and/or take images of one or more physical structures at the location. For example, if the user is in a bedroom remote device 204 may prompt the user to take images of the bedroom window to check for damage. In some other embodiments, remote device 204 may automatically take pictures or video without prompting a user. Optionally, remote device 204 could prompt a user to aim the camera at a certain area or feature in the room but may take images or videos automatically without further user action.

In step 404, remote device 204 sends image information to server 203 of centralized computer system 202 over a network (for example, network 206). The term "image information", as used herein, refers to any information corresponding to photos or videos. Image information could be stored in any known image file formats, such as JPEG, TIFF, GIF, PNG and BMP. Image information could also be stored in any known video file formats, such as AVI, FLV, WMV, MOV and MP4.

Next, in step 406, server 203 may receive the image information from remote device 202. Following this, in step 408, server 203 may analyze the image information and identify potential damage. Specifically, the image information may be processed by one or more machine learning and/or machine vision algorithms to detect and classify physical damage to one or more physical structures. As an example, during step 408, server 203 could receive an image of a window. This image could be input into a machine learning module configured to detect and classify damage. The output of the module may be damage information, such as whether or not damage was detected (yes or no) and the classification of any detected damage (for example, broken window). This damage information may be stored locally, stored on a database (for example, databases 212) and/or sent to remote device 204.

In step 410, server 203 may prepare and send instructions (and/or other information) to remote device 204. The instructions may be based on information from step 408. For example, after server 203 determines the state (i.e., damaged or undamaged) of a bedroom window from an image during step 408, server 203 could prepare and send instructions to remote device 204 to prompt the user to move on to another room or a different feature in the room.

Based on the instructions that remote device 204 receives during step 412, remote device 204 may prompt the user to move to a new location in step 414. In step 416, remote device 204 may confirm that the user has moved to the new location. The remote device may confirm that the user has moved using various methods and available systems. For example, the remote device could monitor accelerometer information from an accelerometer (and/or gyroscopic information from a gyroscope sensor) to determine that the user has moved the desired direction and/or distance. In some cases, the remote device could use image information to determine if/where a user has moved. In some cases, an augmented reality system may use image information from a camera along with acceleration and angular velocity information to determine if the user has moved to the requested location. As another example, the remote device could use GPS information to confirm that the user has moved to the requested location. At this point remote device 204 could continue prompting the user to capture new image information for processing by server 203.

The embodiment of FIG. 4 is characterized by a process where steps 406, 408 and 410 are performed by a server of a centralized computer system. Optionally, in some other embodiments, some of steps 406-410 could performed by remote device 204.

Figure 5:
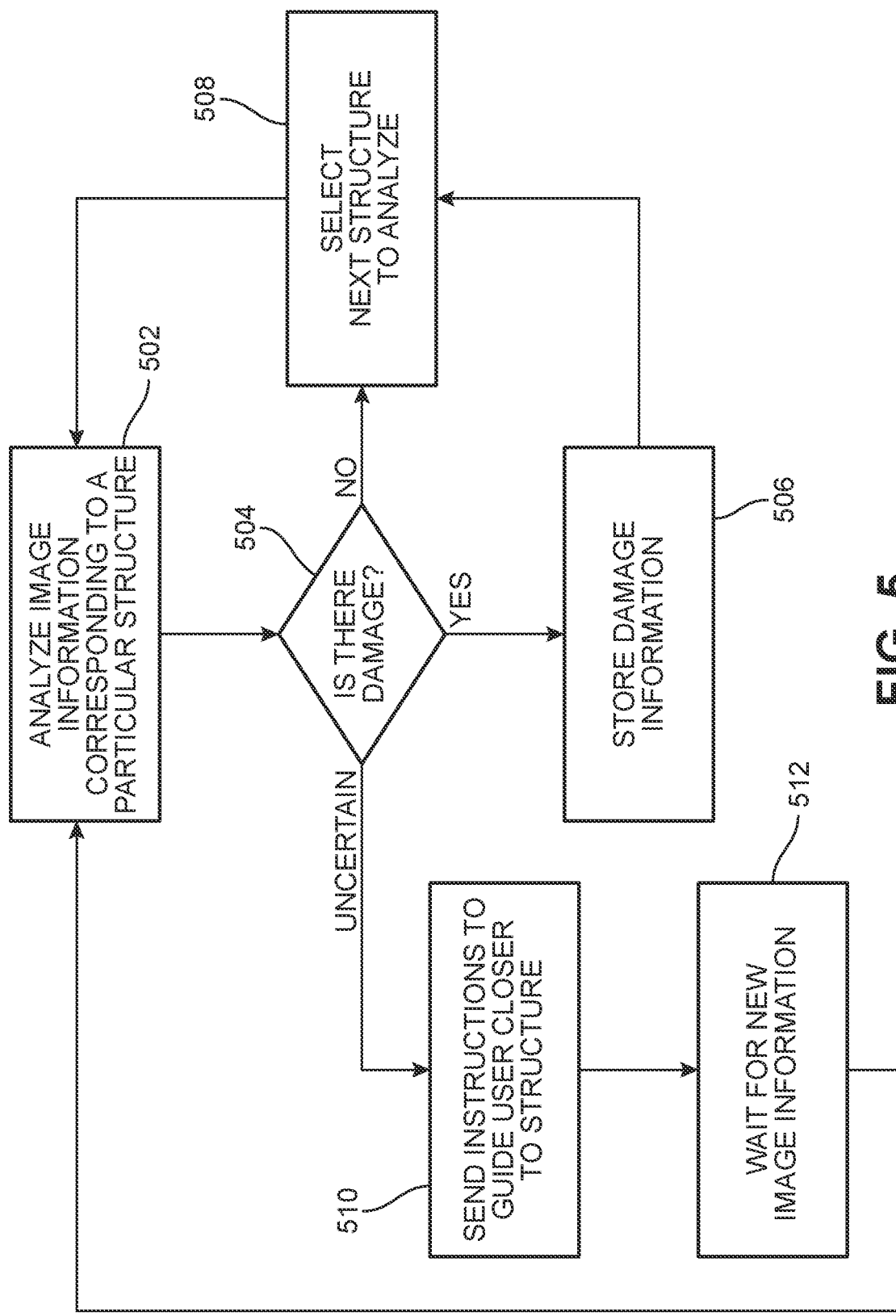
FIG. 5 is a schematic view of a process for assessing if there is damage to a physical space, according to an embodiment.

Referring next to FIG. 5, in some embodiments the system may undergo a feedback loop when attempting to identify and classify damaged physical structures. In one embodiment, the steps illustrated in FIG. 5 may be performed by centralized computer system 202 as part of the process for analyzing image data and determining if there is damage.

At step 502, centralized computer system 202 may analyze image information corresponding to a physical structure in a physical space. For example, image information corresponding to a particular physical structure may be provided as input to a machine learning system that detects and/or classifies physical damage. Based on the output of the machine learning system, centralized computer system 202 may decide what action to take at step 504. If there is damage detected, centralized computer system may move to step 506 to store damage information related to the structure. Following this centralized computer system 202 may proceed to step 508 to select the next structure to analyze, and may then return to step 502 to analyze images of the new structure. If, during step 504 centralized computer system 202 determines that there is no damage, centralized computer system 202 may proceed immediately to step 508 to select the next structure to analyze.

It may be the case that a machine learning system outputs a result that indicates substantial uncertainty in detecting damage to a structure. For example, the machine learning system could be designed to output a range of probabilities that a structure is damaged. Outputs with a relatively high probability of damage (for example, 80-100%) are assumed to have damage and outputs with a relatively low probability of damage (for example, 0-20%) are assumed to have no damage. Outputs with an intermediate probability (for example, between 20 and 80%) may be treated as too uncertain to label as damaged or undamaged. In this case, the guided inspection system could take actions to gather additional data to achieve a more accurate detection/classification.

If, during step 504, centralized computer system 202 determines there is uncertainty in classifying a structure (or an image corresponding to the structure) as damaged or not damaged, centralized computer system 202 may proceed to step 510. In step 510, centralized computer system 202 may prepare and send instructions to guide the user closer to the structure to obtain additional image information. Specifically, in some cases, the instructions are submitted to remote device 204.

Next, in step 512, centralized computer system 202 may wait for new image information. Once the new image information has been received centralized computer system 202 proceeds back to step 502 to analyze the new image information. Such a process may be iterated until centralized computer system 202 has sufficiently good image information to determine with high confidence if the structure is or isn't damaged.

In some embodiments, the instructions sent from centralized computer system 202 to remote device 204 may include navigation information. As used herein, the term "navigation information" refers to any information that can be used in determining a location and/or providing directions or instructions from one location to another. In the context of navigating physical spaces such as apartments, houses and other buildings, navigation information can include relative and absolute location information. Absolute location information can include rooms, GPS coordinates or other geographical information. Absolute location information may also be identified with the locations of known fixed structures such as doors, walls, windows, countertops and support beams. An example of relative location information includes giving a linear distance from a known fixed structure (such as a set distance from a particular window).

To guide a user through a physical space and provide instructions to move relative to a structure, or to move between different structures, a guided inspection system may incorporate a model of the physical space. In some embodiments, the model may be implemented by an augmented reality system that identifies new structures (for example, walls and doors) and builds a real-time model of both the physical space and the remote device/camera within the physical space. Using this model, the system can provide navigation instructions to a user. Specifically, the system can provide navigation instructions directing the user to move closer to a structure, or more generally to move between two different locations within the physical space.

To build a real-time model of the physical space and locate and track the changing position and/or orientation of the remote device in the physical space, a system may make use of multiple modes of sensory data from the remote device. For example, some embodiments may use a combination of image information from the camera of a remote device, acceleration information from an accelerometer of the remote device and angular velocity information from a gyroscope of the remote device to map out the physical space in real time and orient/track the remote device through the physical space. As described above, some AR software algorithms may use SLAM type algorithms (such as Visual SLAM) to build the model of the physical space and track the remote device (and user) through the space.

Apart from using augmented reality techniques, a system could make direct use of GPS information and/or map information provided ahead of time. In some cases, maps of the interior of a rental structure may be available from a third party and/or from the owner/manager of the rental property. A system could retrieve a map of the physical space and use GPS information received through a GPS receiver to track movement and position of the remote device/user.

Figure 6:
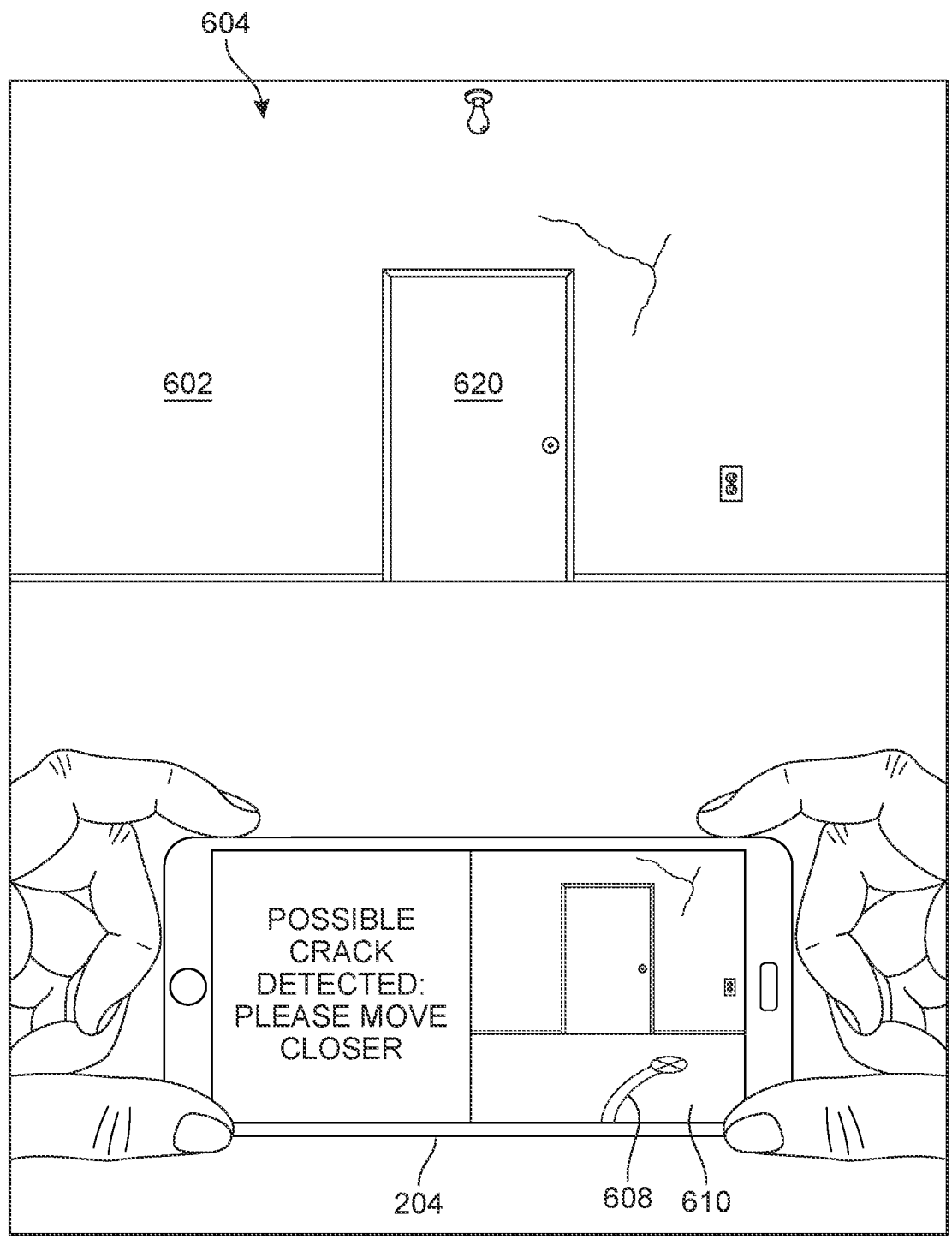
FIG. 6 is a schematic view of a situation where a system prompts a user to move closer to a region with possible damage, according to an embodiment.
Figure 7:
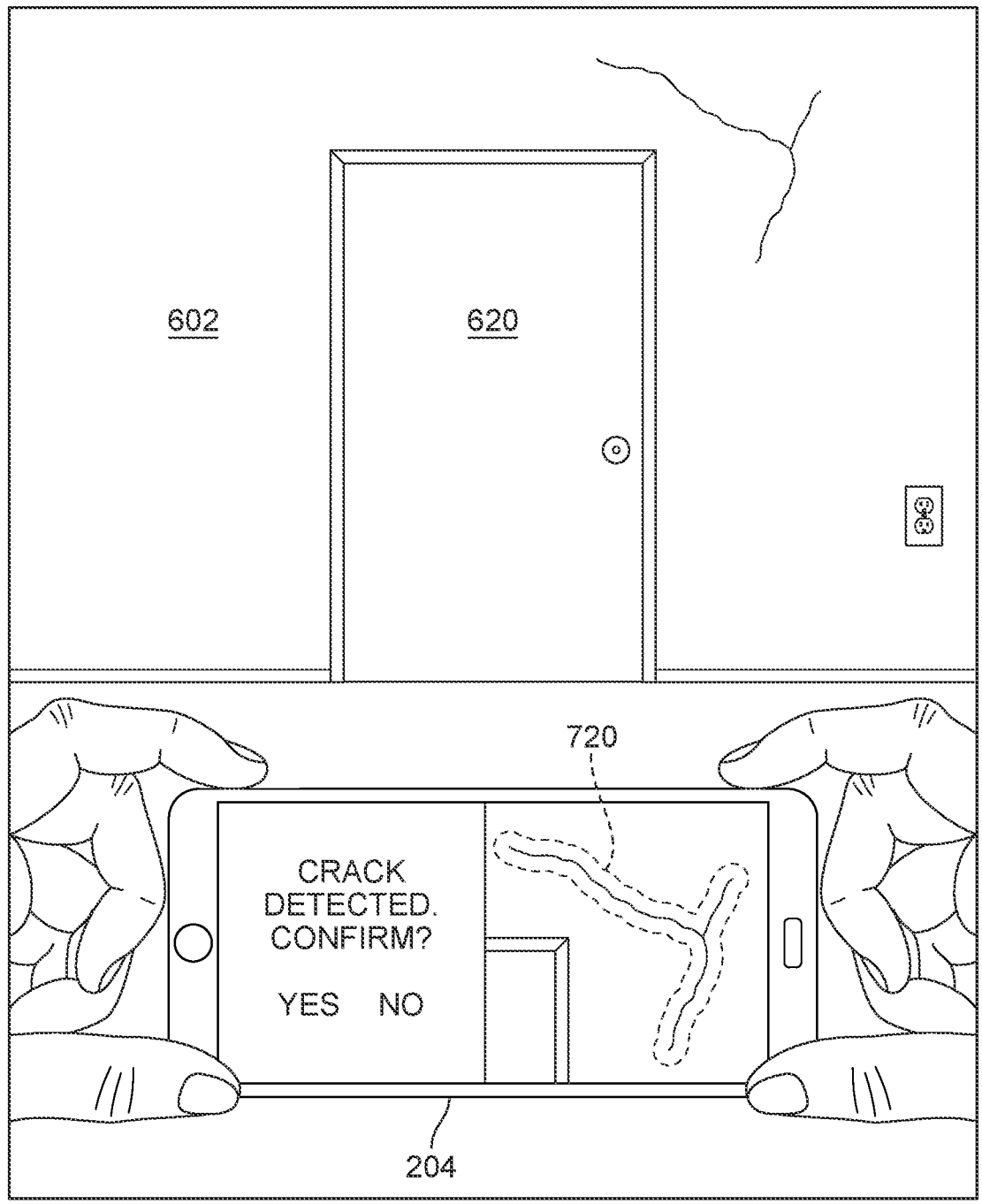
FIG. 7 is a schematic view of a situation where a system prompts a user to confirm if there is damage in the highlighted region, according to an embodiment.

FIGS. 6 and 7 depict an exemplary situation where a user is guided closer to a wall based on uncertainty in identifying damage to the wall. In FIG. 6, a user is holding remote device 204 in the direction of wall 602. Remote device 204 has captured images of a wall 602 in a bedroom 604. After processing the image information corresponding to the captured images, the guided inspection system is unable to determine if the image should be classified as showing damage or not. Because of this uncertainty, centralized computer system 202 sends back instructions to remote device 204. Based on these instructions, remote device 204 prompts the user to move to a location that is closer to a possible crack in the wall. In the exemplary embodiment, remote device 204 may use augmented reality to display a path 608 and a destination over the real-time image 610 of the physical space.

In FIG. 7, the user has moved closer to the door resulting in remote device 204 obtaining better quality images of the region just above door 620. At this point the newly obtained image information is sent to centralized computer system 202 for processing and assessment. Centralized computer system 202 returns damage information and remote device 204 alerts the user of damage that has been detected. In the example of FIG. 7, the system may prompt the user to confirm that there is in fact damage to one or more structures shown on the screen. To clarify what structure is possibly damaged, remote device 204 may display a highlighted boundary 720 around the damage in the live video feed of the area.

While the embodiment of FIG. 7 depicts text-based prompts to provide instructions to a user, audible prompts, in the form of computer generated speech and/or other kinds of prompts could also be used. In some cases, multiple types of prompts can be used simultaneously, including a combination of text/indicia and spoken instructions.

It may be appreciated that during this process centralized computer system 202 could provide other kinds of instructions. As one example, if an image processed at centralized computer system 202 is out of focus or not centered sufficiently on a given physical structure, centralized computer system 202 may prepare and send instructions to have images retaken, either manually by a user or automatically by remote device 204.

A guided inspection system may also include provisions for detecting when a structure to be inspected is obscured. For example, during an inspection the blinds on a window may be down. This allows the system to determine if the blinds are damaged, but obscures the window itself from view. In that situation a guided inspection system could be configured to automatically detect the obscured window and prompt the user to raise the blinds so the window can be inspected.

Figure 8:
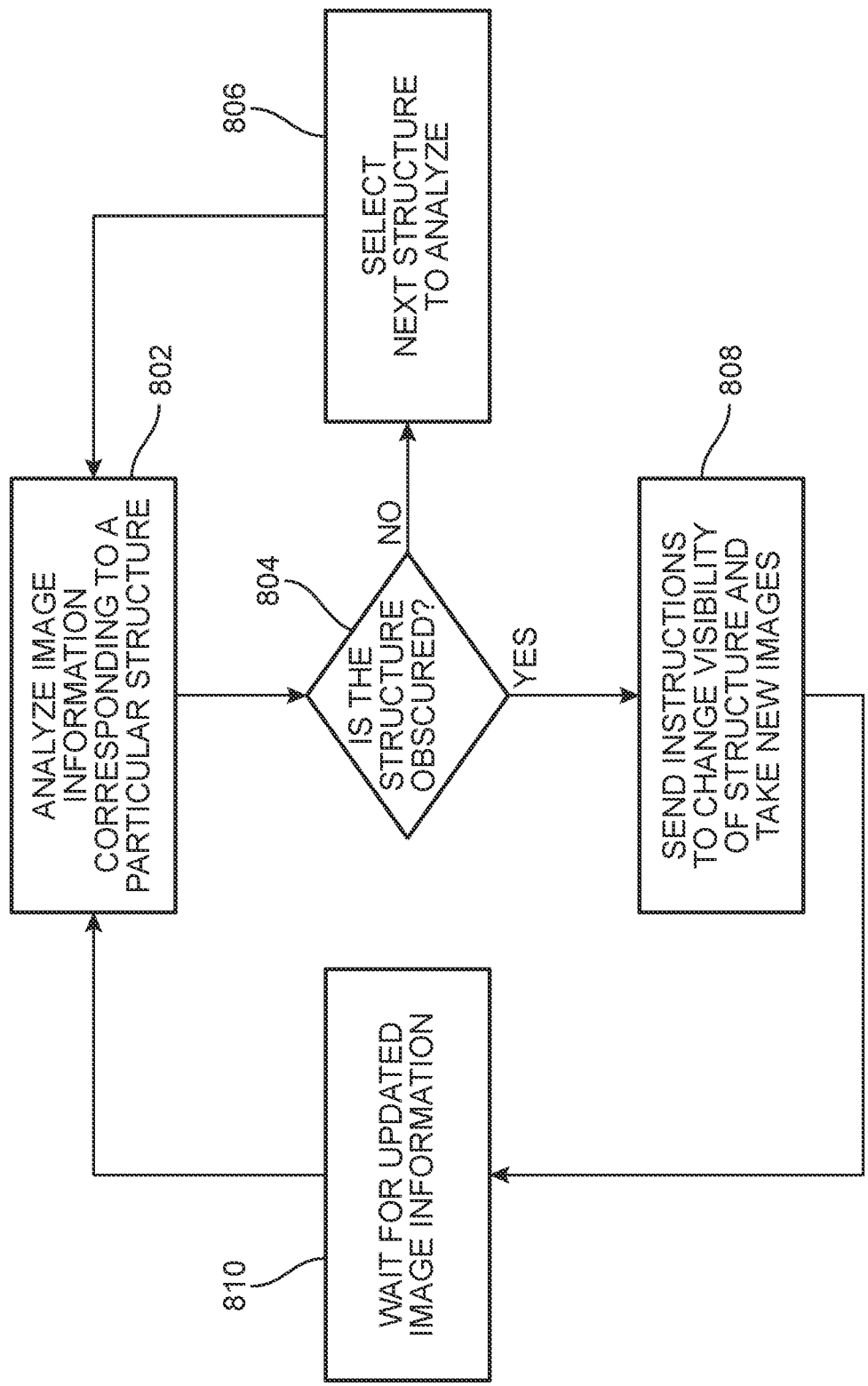
FIG. 8 is a schematic view of a process for determining if a structure is being obscured, according to an embodiment.

A process for automatically depicting obscured objects is shown in FIG. 8. In step 802, centralized computer system 202 may analyze image information corresponding to a particular structure. Next, in step 804, centralized computer system 202 may determine if any structures associated with the image information are being obscured. If not, centralized computer system 202 proceeds to step 806 to select another structure to analyze. In some cases, the system can then proceed back to step 802. If it is determined during step 804 that there is an obscured structure, centralized computer system 202 proceeds to step 808.

Figure 9:
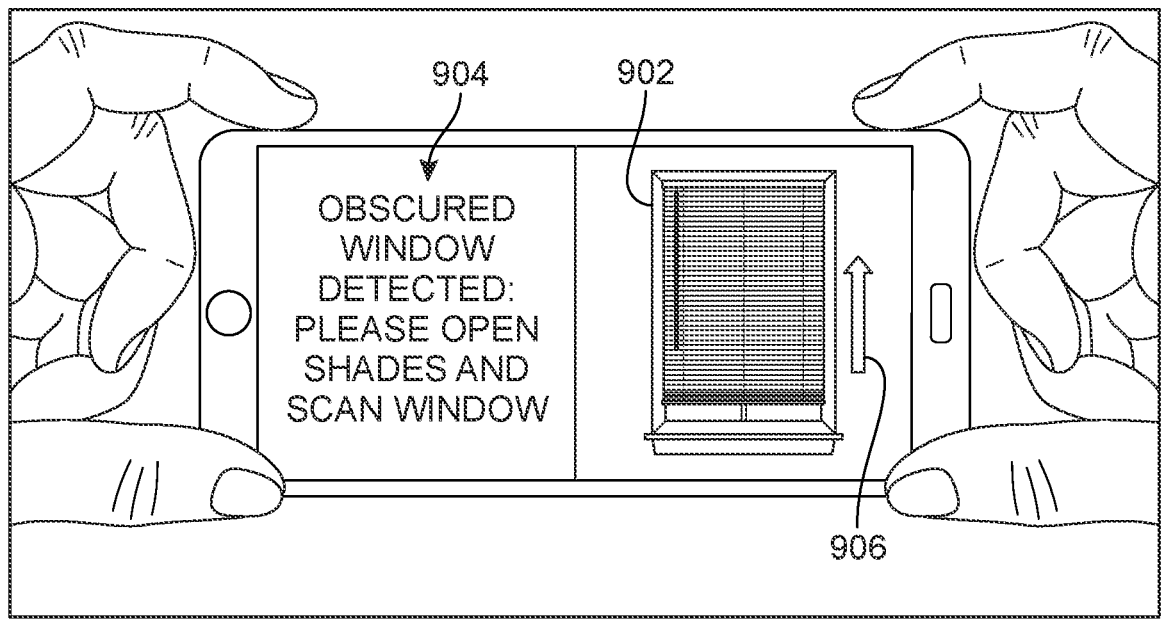
FIG. 9 is a schematic view of a situation where a window is obscured, according to an embodiment.

In step 808, centralized computer system 202 sends instructions to a remote device. The instructions indicate that there is an obscured structure and action must be taken to make the obscured structure visible. The instructions may also include a request for the user and/or remote device to take new images once the structure is visible. For example, if the blinds are down centralized computer system 202 may send instructions to raise the blinds and take new images of the window. An example in which remote device 204 has received instructions to prompt a user about an obscured window 902 is depicted in FIG. 9. In this case, remote device 204 prompts the user using text based instructions 904 as well as a visual indicator 906 displayed by an AR system.

In step 810, centralized computer system 202 waits for updated information from a remote device. Once the new image information is received, centralized computer system 202 proceeds back to step 802 to analyze the image information. This process can be iterated until each obscured structure is properly imaged.

While FIG. 9 provides one example of an obscured window and corresponding instructions for making the window visible, it may be appreciated that a guided inspection system can be configured to detect and provide instructions for various other situations where a structure is obscured. In another situation, the blinds on a window may be raised. The system may automatically detect that the blinds are raised and prompt the user to lower them so they can be inspected.

In some situations, one structure may be obscured by another object, such as a piece of furniture. In such a situation, a guided inspection system can automatically detect both the object and obscured structure and prompt a user to move to a new location where the structure of interest won't be obscured.

In another example, a guided inspection system may be configured to detect ambient light conditions. This may be done using a built in ambient light sensor on a remote device, for example. If the system determines that the lighting conditions are poor for taking images in all or part of a physical space, it may automatically turn on a camera light on the remote device (or instruct a user to do so).

Embodiments can use any combination of processes described above and shown in FIGS. 3-9. For example, in one embodiment, a centralized computer system may combine processes for dealing with uncertain classifications as shown in FIG. 6 and processes for dealing with obscured structures as shown in FIG. 8. That is, when a system is analyzing image information it may detect both potential damage and obscured structures at the same time.

A guided inspection system may provide various kinds of outputs during and/or after an inspection has been completed. In some embodiments, the system can generate an automated report or inspection form. For example, following an inspection a user could have the system generate an inspection form listing any damages. The user could then have the system send that inspection form to the landlord, property manager, owner or other party.

In some embodiments, a guided inspection system could be used to help with routine maintenance. For example, during the guided inspection the system could have the user inspect the batteries in any smoke detectors that it automatically identifies. The system could also be configured to identify other parts that may need regular maintenance, like hoses, pipes, wires, filters or other replaceable structures. Any software running on the remote device could be configured to provide regular maintenance reminders to a user. After being reminded, the user could activate a new instance of the guided inspection in a "maintenance" mode, in which the system primarily focusses on ongoing maintenance issues.

In some embodiments, images, damage information and/or other kinds of information gathered or generated during an inspection could be stored for later use by the system. In one embodiment, the data for a given physical space could be stored as part of an ongoing record. This ongoing record could provide a historical record of the apartment, house, or other property that could be provided to future tenants, owners, managers or other parties.

To detect and classify structures and/or damage, the embodiments may utilize a machine learning system. As used herein, the term "machine learning system" refers to any collection of one or more machine learning algorithms. Some machine learning systems may incorporate various different kinds of algorithms, as different tasks may require different types of machine learning algorithms. Generally, a machine learning system will take input data and output one or more kinds of predicted values. The input data could take any form including image data, text data, audio data or various other kinds of data. The output predicted values could be numbers taking on discrete or continuous values. The predicted values could also be discrete classes (for example, a "damaged" class and an "undamaged" class). Numerical outputs could represent a probability that the input belongs to a various classes. Moreover, it may be appreciated that the same machine learning system can be used for training, testing and deployment, in some cases.

Referring to FIG. 10, a guided inspection system may use machine learning system 1000 to detect and classify structures and/or damage to structures. In the example of FIG. 10, machine learning system 1000 is trained on input data 1002. Input data 1002 comprises various images of damaged structures (cracked wall 1010, broken blinds 1012, shattered window 1014 and torn carpet 1016). Although not shown in FIG. 10, the training data may also include images of undamaged structures so that the system can learn to distinguish between damaged structures and undamaged structures. In some cases, machine learning system 1000 may continue to train on new data as it is received from ongoing use of the guided inspection system by many different users. Furthermore, because the system can optionally ask users to confirm if images have been correctly identified/classified, this provides a means of generating new supervised training data with the image and known classification being provided by users of the system.

In order to learn to detect obscured objects, machine learning system 1000 may also be trained on images of obscured objects. These may include images of closed blinds (obscuring the window) and open blinds (obscuring the blinds). These may also include images of doors open to a position that obscures a wall or other structure behind the door. Thus, the machine learning system can be trained to detect both damaged structures and obscured structures or objects.

The output of machine learning system 1000 is a set of classes. For simplicity, only four possible classes are depicted here, corresponding to broken window 1020, torn carpet 1022, crack 1024 and broken blinds 1026. Of course, the system could be configured with a large number of possible classes. Though FIG. 10 depicts a set of possible outputs (classes), for a given input image the system may generally predict a single class from the set of possible classes. Optionally, the system could be configured to select two or more classes where there may be overlap. For example, an image of a room with a large crack running along the wall and ceiling could trigger the system to output the classes "crack in wall" and "crack in ceiling".

Techniques from artificial intelligence and machine learning could be used for image detection and/or recognition as well as for other purposes. For example, the embodiments could make use of any methods from the field of machine (or computer) vision including methods, techniques, or algorithms in machine vision and/or feature detection to identify and classify objects. Embodiments may use any known image processing methods such as stitching/registration, filtering, thresholding, pixel counting, segmentation, edge detection, color analysis, blob detection, pattern recognition or template matching, optical character recognition as well as other known methods. Some embodiments may use the scale-invariant feature transform (SIFT) algorithm that is used in object recognition, robotic mapping and image stitching. Embodiments may also use known techniques in deep learning to help process and classify objects within image data. These techniques include various kinds of deep neural networks. In some cases, embodiments may use one or more kinds of convolutional deep neural networks (CNNs) that are commonly used in image recognition and other areas of machine vision.

In some embodiments, various systems such as an AR system and/or a machine learning system could be implemented on a centralized computer system. In some embodiments, an AR system and/or a machine learning system could be provided through a cloud service. In still other embodiments, an AR system and/or a machine learning system could be integrated into software running on a remote device. Moreover, in some embodiments, some components or software modules of a system could run locally on a remote device while other components or modules run on a centralized computer system. For example, an AR system could have modules running on a remote device for storing model parameters and interfacing with sensors, and user interaction components (screen, controls, etc.). The AR system could also have modules running on a centralized computer system for more intensive processing tasks. Likewise, a machine learning system could be configured with some modules running directly on the remote device and other modules running on a centralized computer system for more intensive processing tasks.

It may be appreciated that given sufficient processing power and memory, some or all components of an AR system and/or a machine learning system could be implemented on a remote device (such as a tablet computer). In such embodiments, tasks described above as being completed by a centralized computer system or server could be handled by software modules implemented on the remote device. As one example, though many machine learning algorithms require intensive processing for training, once the parameters of a machine learning model (such as a neural network) have been learned the deployed machine learning algorithm or system may be less computationally intensive to run and could be configured to run efficiently on a mobile computing device such as a smart phone or tablet computer.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of guiding a user through a property inspection of an apartment using a remote device, comprising the steps of:
   capturing image information with the remote device, the image information corresponding to at least one image of the apartment, wherein the at least one image includes an image of a physical structure at a first location inside the apartment;
   analyzing the image information to determine if there is damage to a portion of the physical structure in the apartment based on the image information captured with the remote device, wherein analyzing the image information comprises using a machine learning system to detect damage to the physical structure and the method further includes training the machine learning system using a set of images showing damage to physical structures;

determining, by the machine learning system, that there is uncertainty in classifying the physical structure at the first location as damaged or undamaged based on the image information for the physical structure captured with the remote device at the first location;

based on determining by the machine learning system that there is uncertainty in classifying the physical structure as damaged or undamaged, instructing the user of the remote device to move closer to the physical structure and to capture new image information of the physical structure from a location closer to the physical structure than the first location;

upon classifying the physical structure at the first location as damaged or undamaged by the machine learning system, providing navigation information on a display of the remote device to guide the user to a second location inside the apartment;

determining that a location of the remote device has changed from the first location to the second location; and instructing the user of the remote device to capture new images of the apartment at the second location.

2. The method according to claim 1, wherein the property inspection includes a predetermined set of target physical structures inside the apartment to be inspected; and wherein providing the navigation information includes instructions for the user to move to another location in the apartment corresponding to at least one target physical structure in the set of target physical structures.

3. The method according to claim 1, wherein the machine learning system is implemented by at least one processor of a centralized computer system or a cloud service.

4. The method according to claim 1, wherein the machine learning system is implemented by a processor of the remote device.

5. The method according to claim 1, wherein analyzing the image information by the machine learning system to detect damage to the physical structure comprises outputting a probability that the physical structure is damaged.

6. The method according to claim 5, wherein, when the probability is within a first range of probabilities, damage to the physical structure is determined;

wherein, when the probability is within a second range of probabilities that is less than the first range of probabilities, the physical structure is determined to be undamaged; and wherein, when the probability is within a third range of probabilities that is less than the first range of probabilities and more than the second range of probabilities, damage to the physical structure is determined to be uncertain.

7. A remote device for guiding a user through a property inspection comprising:

a camera;

a display; and at least one processor configured to implement instructions stored in memory of the remote device to cause the remote device to:

display a map of an interior of a home on the display of the remote device, the map including a plurality of physical structures located within the interior of the home along with an associated location for each physical structure of the plurality of physical structures;

display a path on the map on the display of the remote device from a current location of the remote device to a first location associated with a first physical structure of the plurality of physical structures;

capture image information of the first physical structure inside the home at the first location;

send the image information to a server, the image information including at least one image of the first physical structure inside the home;

receive instructions from the server, the instructions including navigation information directing the user from the first location to a second location inside the home, the second location being associated with a second physical structure of the plurality of physical structures inside the home, the second physical structure being different from the first physical structure;

prompt the user on the remote device to move to the second location in the home in response to the instructions, wherein prompting the user includes displaying a path on the map on the display of the remote device from the first location to the second location;

monitor movement of the remote device to confirm that the user has moved to the second location; and upon confirming that the user has moved to the second location, prompt the user on the remote device to capture an image of the second physical structure at the second location.

8. The remote device according to claim 7, further comprising an accelerometer; and wherein the instructions implemented by the processor to cause the remote device to monitor the movement of the remote device include receiving information from the accelerometer.

9. The remote device according to claim 7, wherein the map of the interior of the apartment includes a predetermined sequence of the plurality of physical structures that are to be inspected.

10. The remote device according to claim 7, wherein the instructions implemented by the processor to cause the remote device to direct the user with the navigation information further include displaying directions to the second location on the display of the remote device using augmented reality.

11. The remote device according to claim 7, wherein the instructions implemented by the processor for prompting the user cause the remote device to direct the user to move the remote device closer to the physical structure.

12. The remote device according to claim 7, wherein the instructions implemented by the processor further cause the remote device to indicate a physical structure with potential damage on the display of the remote device using augmented reality.

13. The remote device according to claim 12, wherein the instructions implemented by the processor further cause the remote device to prompt the user to confirm that the indicated physical structure is damaged.

14. The remote device according to claim 7, wherein prompting the user includes displaying text on the display.

15. The remote device according to claim 7, further comprising speakers; and wherein the instructions implemented by the processor to cause the remote device to prompt the user include generating spoken words to be played through the speakers.

16. A remote device for guiding a user through a property inspection of an apartment comprising:
a camera;
a display; and
at least one processor configured to implement instructions stored in memory of the remote device to cause the remote device to:
capture image information using the camera, the image information corresponding to at least one image of the apartment;
detect an obscured physical structure inside the apartment using the image information, wherein detecting the obscured physical structure includes inputting the image information into a machine learning system that has been previously trained using a set of images showing obscured physical structures;
provide instructions to the user on the remote device to modify the visibility of the obscured physical structure so that the physical structure is no longer obscured, wherein the instructions prompt the user to change the state of a window treatment to an open or closed position so that the physical structure is no longer obscured in order to capture an image of the physical structure;
capture new images of the physical structure using the camera that are no longer obscured; and
based on the new images of the physical structure that are no longer obscured, determine, by the machine learning system, whether the physical structure is damaged or undamaged.

17. The remote device according to claim 16, wherein the instructions implemented by the processor further cause the remote device to prompt the user to change the lighting conditions in the apartment.

18. The remote device according to claim 16, wherein determining, by the machine learning system whether the physical structure is damaged or undamaged comprises outputting a probability that the physical structure is damaged.

19. The remote device according to claim 18, wherein, when the probability is within a first range of probabilities, damage to the physical structure is determined;
wherein, when the probability is within a second range of probabilities that is less than the first range of probabilities, the physical structure is determined to be undamaged; and
wherein, when the probability is within a third range of probabilities that is less than the first range of probabilities and more than the second range of probabilities, damage to the physical structure is determined to be uncertain.

20. The remote device according to claim 19, wherein the machine learning system is trained using a set of images showing damage to physical structures and another set of images showing undamaged physical structures.

* * * * *